United States Patent
McNamara et al.

(10) Patent No.: US 11,972,215 B2
(45) Date of Patent: Apr. 30, 2024

(54) METHOD AND SYSTEM FOR AUTOMATING SUPPORT SERVICES

(71) Applicant: JPMorgan Chase Bank, N.A., New York, NY (US)

(72) Inventors: Kevin J McNamara, Newfoundland, NJ (US); Eugene Mariotti, Enfield (GB)

(73) Assignee: JPMORGAN CHASE BANK, N.A., New York, NY (US)

(*) Notice: Subject to any disclaimer, the term of this patent is extended or adjusted under 35 U.S.C. 154(b) by 143 days.

(21) Appl. No.: 16/950,289

(22) Filed: Nov. 17, 2020

(65) Prior Publication Data
US 2022/0156462 A1   May 19, 2022

(51) Int. Cl.
*G06F 40/30* (2020.01)
*G06F 40/211* (2020.01)
*G06N 20/00* (2019.01)
*G06Q 30/016* (2023.01)

(52) U.S. Cl.
CPC ............ *G06F 40/30* (2020.01); *G06F 40/211* (2020.01); *G06N 20/00* (2019.01); *G06Q 30/016* (2013.01)

(58) Field of Classification Search
None
See application file for complete search history.

(56) References Cited

U.S. PATENT DOCUMENTS

| | | | |
|---|---|---|---|
| 8,468,149 B1* | 6/2013 | Lung | G06Q 50/01 |
| | | | 707/769 |
| 10,951,762 B1* | 3/2021 | Brandt | G06Q 20/40 |
| 2005/0027575 A1* | 2/2005 | Amitabh | G06Q 30/016 |
| | | | 705/304 |
| 2015/0227941 A1* | 8/2015 | Tuchman | H04M 3/5183 |
| | | | 705/7.14 |
| 2018/0033019 A1* | 2/2018 | Mora | G06Q 50/01 |
| 2018/0239837 A1 | 8/2018 | Wang | |
| 2019/0138937 A1 | 5/2019 | Bahrs et al. | |
| 2019/0258948 A1* | 8/2019 | Ray | G06N 5/022 |
| 2020/0044992 A1 | 2/2020 | Kumar et al. | |

OTHER PUBLICATIONS

International Search Report and Written Opinion in corresponding International Application No. PCT/2021/059382, dated Feb. 9, 2022.

* cited by examiner

*Primary Examiner* — Nafiz E Hoque
(74) *Attorney, Agent, or Firm* — Greenblum & Bernstein, P.L.C.

(57) ABSTRACT

A method for providing automated support services by utilizing artificial intelligence is disclosed. The method includes receiving, via a graphical user interface, a request from a user; parsing, by using syntax analysis, the request; identifying, from the parsed request, a factor by using a model such as a machine learning model, the factor including a request context and a request sentiment; associating the request with a category corresponding to the factor; determining, by using the model, whether the request can be automatically resolved based on the factor and the category; and initiating at least one action based on a result of the determining.

20 Claims, 6 Drawing Sheets

METHOD AND SYSTEM FOR AUTOMATING SUPPORT SERVICES

BACKGROUND

1. Field of the Disclosure

This technology generally relates to methods and systems for automating support services, and more particularly to methods and systems for providing automated support services by utilizing artificial intelligence to identify and resolve issues in natural language service requests.

2. Background Information

Many business entities must operate vast computing infrastructures comprising numerous computing devices and numerous network systems to conduct business activities. To manage technical issues inherent in these vast computing infrastructures, business entities offer support services to help users identify and resolve the technical issues. Historically, offering support services provided by human operators have resulted in varying degrees of success with respect to operating efficiency and user experience.

One drawback of using conventional support services provided by human operators is that in many instances, a rapid increase in submitted service tickets will overwhelm support systems. As a result, critical technical issues are not resolved in adequate timeframes leading to operational inefficiencies and negatively affecting user experience. In addition, due to the use of human operators, conventional service tickets often include natural language descriptions of issues. As such, traditional computer automation techniques are frequently ineffective and unreliable.

Therefore, there is a need for a scalable automated support service that utilizes artificial intelligence techniques such as, for example, machine learning to automatically identify and automatically resolve issues in natural language service requests.

SUMMARY

The present disclosure, through one or more of its various aspects, embodiments, and/or specific features or sub-components, provides, inter alia, various systems, servers, devices, methods, media, programs, and platforms for providing automated support services by utilizing artificial intelligence to identify and resolve issues in natural language service requests.

According to an aspect of the present disclosure, a method for providing automated support services by utilizing artificial intelligence is disclosed. The method may be implemented by at least one processor. The method may include receiving, via a graphical user interface, at least one request from a user; parsing, by using syntax analysis, the at least one request; identifying, from the parsed at least one request, at least one factor by using at least one model, the at least one factor may include at least one from among a request context and a request sentiment; associating the at least one request with a category corresponding to the at least one factor; determining, by using the at least one model, whether the at least one request can be automatically resolved based on the at least one factor and the category; and initiating at least one action based on a result of the determining.

In accordance with an exemplary embodiment, the at least one request may relate to a support service inquiry corresponding to at least one from among an issue and a task.

In accordance with an exemplary embodiment, the method may further include compiling status data when the at least one request is received from the user, the status data may include at least one from among network data, storage data, server data, application data, and local machine data, and associating the status data with the at least one request.

In accordance with an exemplary embodiment, the method may further include identifying, by using the at least one model, at least one self-help resource based on a predetermined rule and the at least one factor, the at least one self-help resource may include at least one from among an instructional video, an instructional electronic document, and a hyperlink; transmitting, via a communication interface, the at least one self-help resource to the user in response to the at least one request; and updating the at least one request with information relating to the identified at least one self-help resource.

In accordance with an exemplary embodiment, the method may further include determining, by using the at least one model, whether a live agent is required to resolve the at least one request based on the at least one factor; transmitting, via a communication interface, the at least one request to the live agent based on a result of the determining, and receiving, via the communication interface, an indication from the live agent that the at least one request has been resolved, the indication may include a live agent action.

In accordance with an exemplary embodiment, the method may further include identifying, by using the at least one model, at least one new request, the at least one new request may include a new factor that is equivalent to the at least one factor, and initiating the live agent action to resolve the at least one new request.

In accordance with an exemplary embodiment, the method may further include determining, by using the at least one model, whether additional information is required from the user to automatically resolve the at least one request; and transmitting, based on a result of the determining, a notification to the user via a communication interface, the notification may include an email notification requesting the additional information.

In accordance with an exemplary embodiment, the method may further include generating a support ticket, the support ticket may relate to an interaction between the user and a support provider; generating an identifier; and associating the identifier and the at least one request with the support ticket.

In accordance with an exemplary embodiment, the at least one model may include at least one from among a machine learning model, a mathematical model, a process model, and a data model.

In accordance with an exemplary embodiment, the syntax analysis may include at least one natural language processing technique that relates to automatic manipulation of natural language by computer software.

According to an aspect of the present disclosure, a computing device configured to implement an execution of a method for providing automated support services by utilizing artificial intelligence is disclosed. The computing device comprising a processor; a memory; and a communication interface coupled to each of the processor and the memory, wherein the processor may be configured to receive, via a graphical user interface, at least one request from a user; parse, by using syntax analysis, the at least one request; identify, from the parsed at least one request, at least one factor by using at least one model, the at least one factor may include at least one from among a request context and a request sentiment; associate the at least one request with a category corresponding to the at least one factor; determine, by using the at least one model, whether the at least one request can be automatically resolved based on the at least one factor and the category; and initiate at least one action based on a result of the determination.

In accordance with an exemplary embodiment, the at least one request may relate to a support service inquiry corresponding to at least one from among an issue and a task.

In accordance with an exemplary embodiment, the processor may be further configured to compile status data when the at least one request is received from the user, the status data may include at least one from among network data, storage data, server data, application data, and local machine data; and associate the status data with the at least one request.

In accordance with an exemplary embodiment, the processor may be further configured to identify, by using the at least one model, at least one self-help resource based on a predetermined rule and the at least one factor, the at least one self-help resource may include at least one from among an instructional video, an instructional electronic document, and a hyperlink; transmit, via the communication interface, the at least one self-help resource to the user in response to the at least one request; and update the at least one request with information relating to the identified at least one self-help resource.

In accordance with an exemplary embodiment, the processor may be further configured to determine, by using the at least one model, whether a live agent is required to resolve the at least one request based on the at least one factor; transmit, via the communication interface, the at least one request to the live agent based on a result of the determination; and receive, via the communication interface, an indication from the live agent that the at least one request has been resolved, the indication may include a live agent action.

In accordance with an exemplary embodiment, the processor may be further configured to identify, by using the at least one model, at least one new request, the at least one new request may include a new factor that is equivalent to the at least one factor; and initiate the live agent action to resolve the at least one new request.

In accordance with an exemplary embodiment, the processor may be further configured to determine, by using the at least one model, whether additional information is required from the user to automatically resolve the at least one request; and transmit, based on a result of the determination, a notification to the user, the notification may include an email notification requesting the additional information.

In accordance with an exemplary embodiment, the processor may be further configured to generate a support ticket, the support ticket may relate to an interaction between the user and a support provider; generate an identifier; and associate the identifier and the at least one request with the support ticket.

In accordance with an exemplary embodiment, the at least one model may include at least one from among a machine learning model, a mathematical model, a process model, and a data model.

In accordance with an exemplary embodiment, the syntax analysis may include at least one natural language processing technique that relates to automatic manipulation of natural language by computer software.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
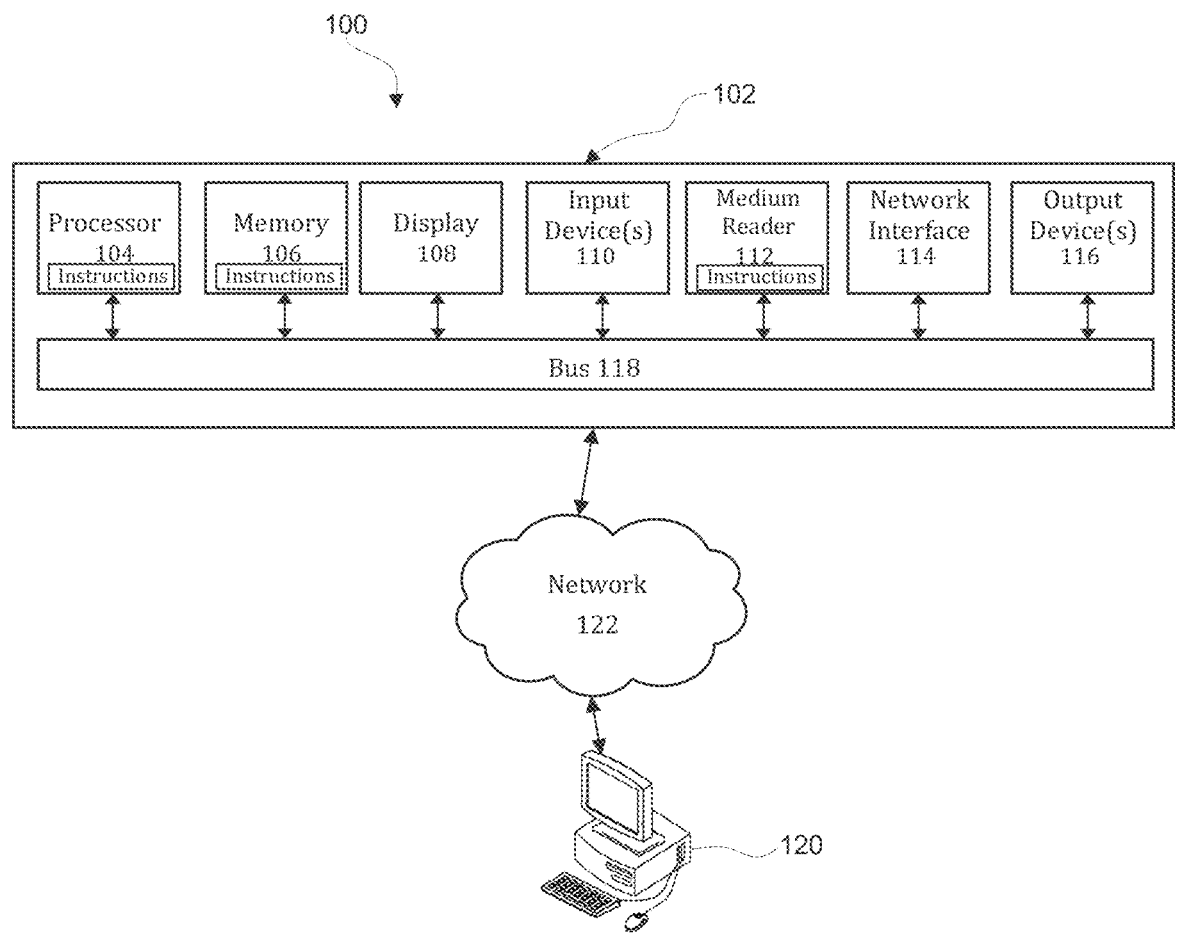
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing automated support services by utilizing artificial intelligence to identify and resolve issues in natural language service requests.

Figure 2:
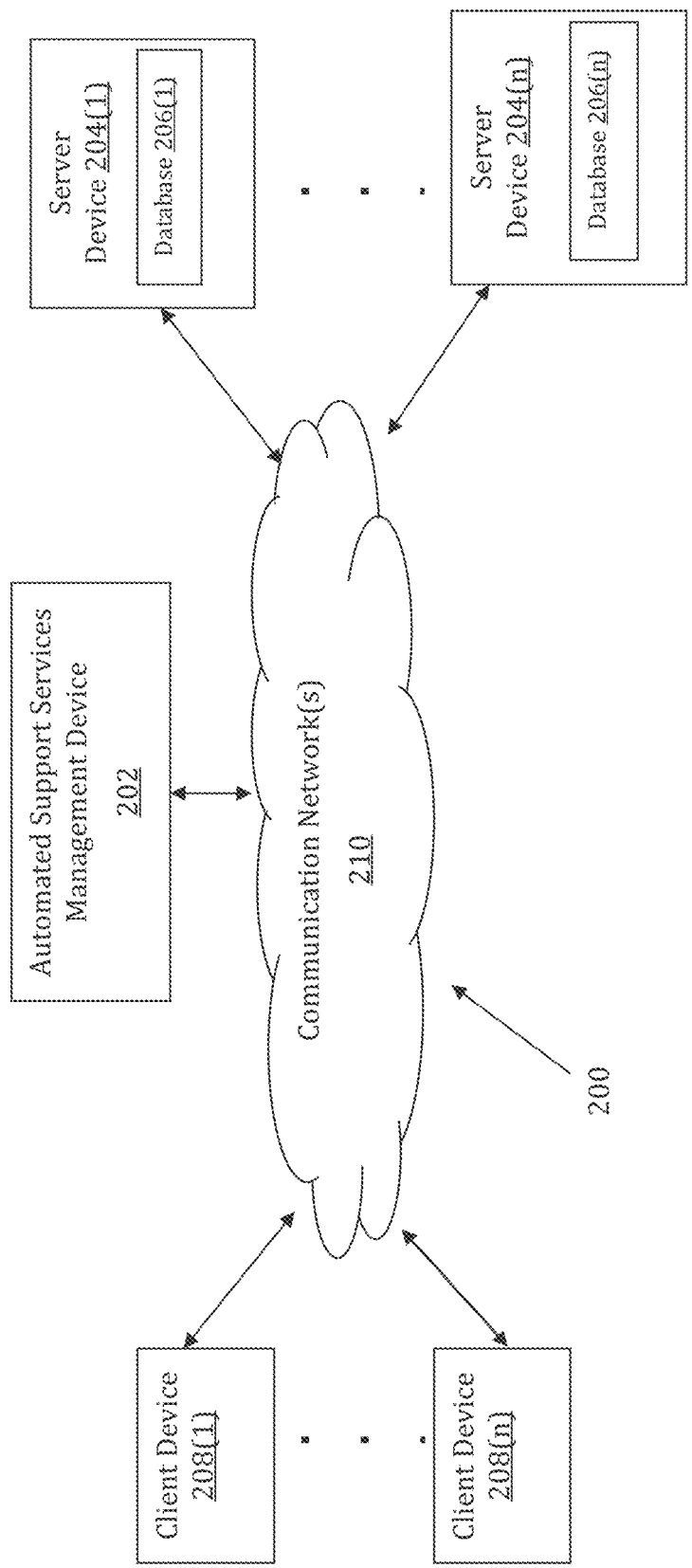
FIG. 2 illustrates an exemplary diagram of a network environment.

Referring to FIG. 2, a schematic of an exemplary network environment 200 for implementing a method for providing automated support services by utilizing artificial intelligence to identify and resolve issues in natural language service requests is illustrated. In an exemplary embodiment, the method is executable on any networked computer platform, such as, for example, a personal computer (PC).

The method for providing automated support services by utilizing artificial intelligence to identify and resolve issues in natural language service requests may be implemented by an Automated Support Services Management (ASSM) device 202. The ASSM device 202 may be the same or similar to the computer system 102 as described with respect to FIG. 1. The ASSM device 202 may store one or more applications that can include executable instructions that, when executed by the ASSM device 202, cause the ASSM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ASSM device 202 itself, may be located in virtual server(s) running in a cloud-based computing environment rather than being tied to one or more specific physical network computing devices. Also, the application(s) may be running in one or more virtual machines (VMs) executing on the ASSM device 202. Additionally, in one or more embodiments of this technology, virtual machine(s) running on the ASSM device 202 may be managed or supervised by a hypervisor.

In the network environment 200 of FIG. 2, the ASSM device 202 is coupled to a plurality of server devices 204(1)-204(n) that hosts a plurality of databases 206(1)-206(n), and also to a plurality of client devices 208(1)-208(n) via communication network(s) 210. A communication interface of the ASSM device 202, such as the network interface 114 of the computer system 102 of FIG. 1, operatively couples and communicates between the ASSM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ASSM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ASSM devices that efficiently implement a method for providing automated support services by utilizing artificial intelligence to identify and resolve issues in natural language service requests.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ASSM device 202 may be a standalone device or integrated with one or more other devices or apparatuses, such as one or more of the server devices 204(1)-204(n), for example. In one particular example, the ASSM device 202 may include or be hosted by one of the server devices 204(1)-204(n), and other arrangements are also possible. Moreover, one or more of the devices of the ASSM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ASSM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to service requests, identifiers, status data, machine learning models, completed actions, and self-help resources.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(l)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ASSM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ASSM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ASSM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ASSM device 202, the server devices 204(1)-204(n), or the client devices 208(1)-208(n), for example, may be configured to operate as virtual instances on the same physical machine. In other words, one or more of the ASSM device 202, the server devices 204(1)-204(n), or the client devices 208(1)-208(n) may operate on the same physical device rather than as separate devices communicating through communication network(s) 210. Additionally, there may be more or fewer ASSM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
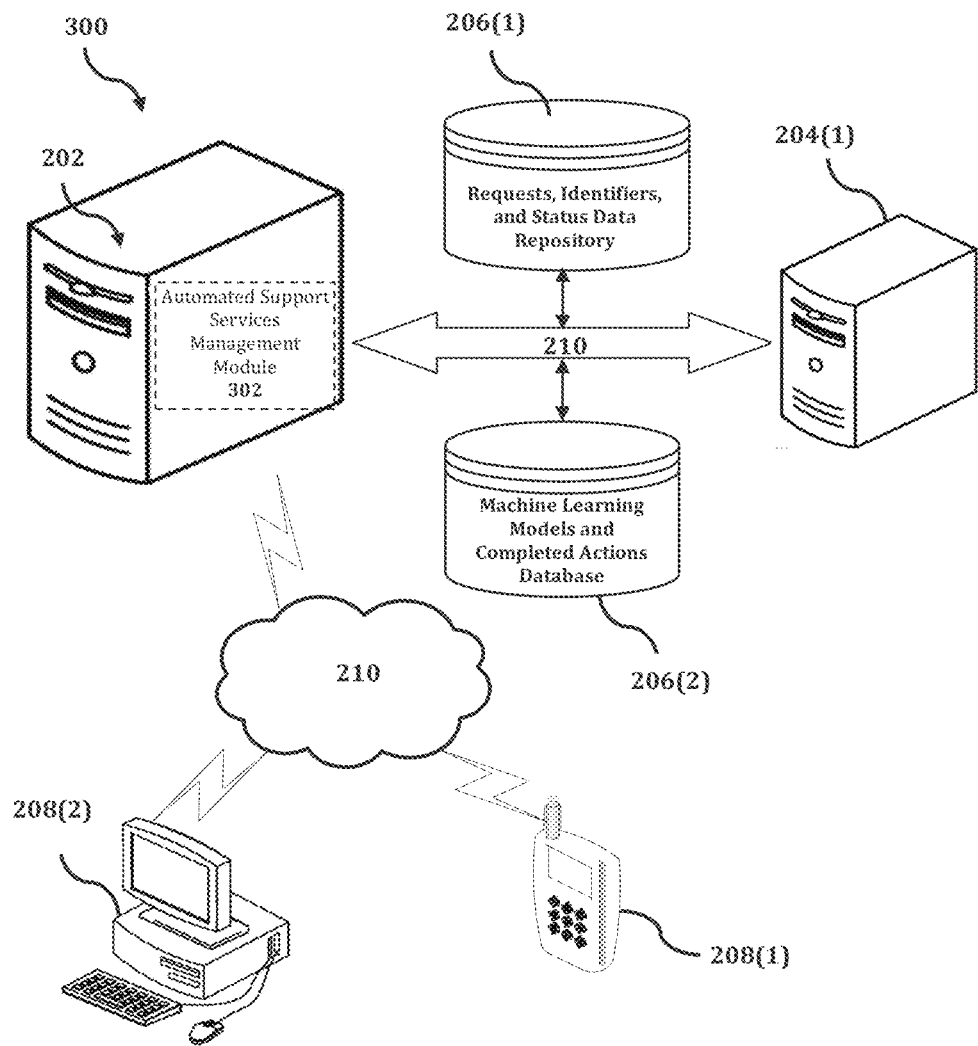
FIG. 3 shows an exemplary system for implementing a method for providing automated support services by utilizing artificial intelligence to identify and resolve issues in natural language service requests.

The ASSM device 202 is described and shown in FIG. 3 as including an automated support services management module 302, although it may include other rules, policies, modules, databases, or applications, for example. As will be described below, the automated support services management module 302 is configured to implement a method for providing automated support services by utilizing artificial intelligence to identify and resolve issues in natural language service requests.

An exemplary process 300 for implementing a mechanism for providing automated support services by utilizing artificial intelligence to identify and resolve issues in natural language service requests by utilizing the network environment of FIG. 2 is shown as being executed in FIG. 3. Specifically, a first client device 208(1) and a second client device 208(2) are illustrated as being in communication with ASSM device 202. In this regard, the first client device 208(1) and the second client device 208(2) may be "clients" of the ASSM device 202 and are described herein as such. Nevertheless, it is to be known and understood that the first client device 208(1) and/or the second client device 208(2) need not necessarily be "clients" of the ASSM device 202, or any entity described in association therewith herein. Any additional or alternative relationship may exist between either or both of the first client device 208(1) and the second client device 208(2) and the ASSM device 202, or no relationship may exist.

Further, ASSM device 202 is illustrated as being able to access a requests, identifiers, and status data repository 206(1) and a machine learning models and completed actions database 206(2). The automated support services management module 302 may be configured to access these databases for implementing a method for providing automated support services by utilizing artificial intelligence to identify and resolve issues in natural language service requests.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ASSM device 202 via broadband or cellular communication. Of course, these embodiments are merely exemplary and are not limiting or exhaustive.

Upon being started, the automated support services management module 302 executes a process for providing automated support services by utilizing artificial intelligence to identify and resolve issues in natural language service requests. An exemplary process for providing automated support services by utilizing artificial intelligence to identify and resolve issues in natural language service requests is generally indicated at flowchart 400 in FIG. 4.

Figure 4:
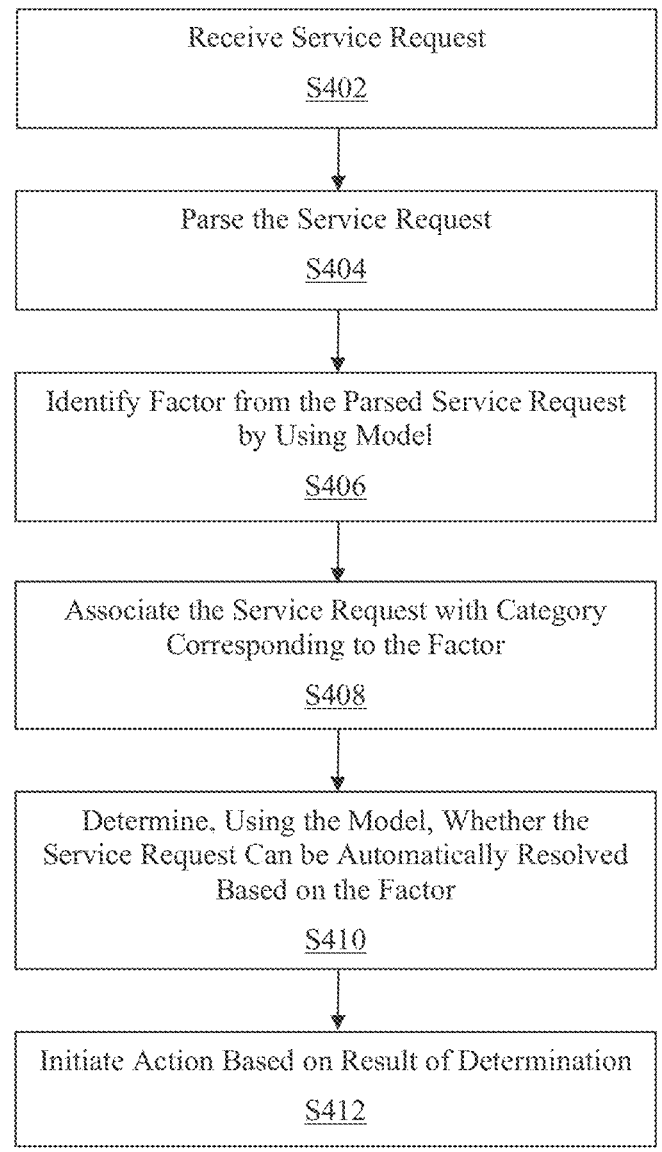
FIG. 4 is a flowchart of an exemplary process for implementing a method for providing automated support services by utilizing artificial intelligence to identify and resolve issues in natural language service requests.

In the process 400 of FIG. 4, at step S402, a request may be received from a user via a graphical user interface. The request may relate to a support service inquiry corresponding to at least one from among an issue and a task. In an exemplary embodiment, the request may be received from an integrated graphical user interface such as, for example, a customer support portal as well as communication channels such as, for example, social media channels, live messaging channels, and email channels. In another exemplary embodiment, the request may include a unique identifier. The unique identifier may be utilized to track quantitative and qualitative feedback within a feedback loop.

In another exemplary embodiment, the request may initiate the creation of a support ticket. The support ticket may include information which describes the interaction between a user and a service representative. For example, when a user has an issue, the user may submit a request via a graphical user interface. The system may then generate a support ticket that is associated with the user and the issue. Service representatives may interact with the user to resolve the issue and the support ticket may by updated to include actions taken by the service representatives.

In another exemplary embodiment, the request may be received from computing platforms such as, for example, a cloud computing platform that enable management of digital workflows in an enterprise environment. The computing platform may include third-party computing platforms such as, for example, a SERVICENOW cloud computing platform as well as internally developed computing platforms. As will be appreciated by a person of ordinary skill in the art, systems disclosed in the present application may operate separately from the computing platforms as well as directly integrated into the computing platforms via algorithms that are placed in software containers as well as docker images on virtual nodes.

In another exemplary embodiment, status data may be compiled when the request is received from the user. The status data may include at least one from among network data, storage data, server data, application data, and local machine data. In another exemplary embodiment, the status data may represent a current state of a computing environment. The status data may be utilized to perform system checks such as, for example, network checks, exchange checks, and local machine checks. In another exemplary embodiment, the status data may be associated with the received request.

At step S404, the received request may be parsed by using syntax analysis. The syntax analysis may include a natural language processing technique that relates to automatic manipulation of natural language by computer software. In an exemplary embodiment, the syntax analysis may incorporate a sentiment engine. The sentiment engine may include a natural language processor that reads environmental contexts corresponding to the received request. In another exemplary embodiment, the sentiment engine may analyze the parsed request to identify user sentiment, hunt for proper names, identify a product at issue, as well as extrapolate where the described issue occurred.

At step S406, a factor may be identified from the parsed request by using a model. The factor may include at least one from among a context of the request and a sentiment of the request. In an exemplary embodiment, the factor may include a calculated score which summarizes the context and the sentiment such as, for example, a user fear factor score. For example, a context of the request may include mention of an integral computing system necessary for a team to perform work activities. Based on this context, a higher importance may be placed on the request. In another example, a sentiment of the request may include extreme angst based on the urgent tone in the description of the issue. Based on this sentiment, the request may be tagged and immediately escalated to a live service representative.

In another exemplary embodiment, the model may include at least one from among a mathematical model, a process model, a data model, and a machine learning model such as, for example, an artificial intelligence language interface for customer experience (ALICE) model. The model may incorporate the sentiment engine, a real-time rules engine, as well as a predictive engine that is usable for anticipating user impact based on a heat map of trends in a plurality of received requests as well as based on forensic database analysis of the collected status data. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that the training model's least squares error rate, true positive rate, true negative rate, false positive rate, and false negative rates are within predetermined ranges. In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S408, the parsed request may be associated with a category corresponding to the identified factor. In an exemplary embodiment, the category may relate to a characteristic of the request. The category may be utilized by systems described in the present application to triage a plurality of similar requests. For example, the category may include urgent issues corresponding to an email client. In another exemplary embodiment, a heat map of current issues may be generated based on the categories to predict future service requests. For example, an increasing heat map of a category corresponding to nonresponsive email clients may illustrate an increase in service requests for that particular issue. Based on the heat map, the system may anticipate that similar service requests will be received in the future. In another exemplary embodiment, the system may preemptively tag the future requests based on the anticipated errors.

At step S410, whether the parsed request can be automatically resolved may be determined based on the identified factor and the category by using the model. In an exemplary embodiment, the model may utilize the predictive engine and the real-time rules engine to determine that the issue in the request may be resolved automatically without human interference. For example, the model may utilize factors such as context and sentiment to determine that a request relating to setup of a voicemail may be resolved automatically by sending the user a self-help resource.

In another exemplary embodiment, the model may utilize machine learning techniques to base decisions on detected patterns and characteristics from the patterns. The model may decide that the request can be automatically resolved without further human interaction. In another exemplary embodiment, the model may base the decision on predetermined guidelines established by the business entity. As will be appreciated by a person of ordinary skill in the art, the model may utilize any combination of detected patterns and predetermined guidelines to make the determination.

At step S412, an action based on a result of the determination may be initiated. The action may correspond to the determination made by the model. For example, the model may determine that a self-help resource is most appropriate to resolve an issue relating to setup of a user's voicemail. Based on this determination, the model may initiate an action which transmits a self-help resource on setting up voicemails to the user.

In another exemplary embodiment, a real-time rules engine may be utilized to determine an appropriate action in response to the request. The real-time rules engine may respond to user tickets on demand, send self-help resources to users, and close tickets. In another exemplary embodiment, the real-time rules engine may interact directly with the user to request additional details on submitted issues as well as to set user expectations. The real-time rules engine may manage a plurality of requests and maintain support tickets by updating the support tickets.

In another exemplary embodiment, a self-help resource may be identified based on a predetermined rule and the factor by using the model. The self-help resource may include at least one from among an instructional video, an instructional electronic document, and a hyperlink. Then, the self-help resource may be transmitted via a communication interface to the user in response to the request. The request may be updated with information relating to the identified self-help resource.

In another exemplary embodiment, whether a live agent is required to resolve the request may be determined based on the factor by using the model. Then, the request may be transmitted via a communication interface to the live agent based on a result of the determination. An indication from the live agent that the request has been resolved may be received via the communication interface. The indication may include a live agent action that was taken to resolve the request.

In another exemplary embodiment, a new request may be identified by using the model. The new request may include a new factor that is equivalent to the factor in the resolved request. Then, the live agent action may be initiated to resolve the new request. For example, the model may receive a request for problem A, which the model identifies as requiring human intervention from a live agent. The live agent may resolve the issue by initiating live agent action A and updating the support ticket. Based on the updated support ticket, the model may automatically initiate the live agent action A to resolve new, incoming requests from other users which have been tagged as including problem A.

In another exemplary embodiment, whether additional information is required from the user to automatically resolve the request may be determined by using the model. A notification may be transmitted to the user via a communication interface based on a result of the determination. The notification may include an email notification requesting the additional information. In another exemplary embodiment, the model may request the additional information from the user by engaging in conversations with the user in a natural language format.

In another exemplary embodiment, a support ticket may be generated. The support ticket may relate to an interaction between the user and a support provider. In another exemplary embodiment, an identifier may also be generated. The identifier and the request may be associated together with the generated support ticket.

Figure 5:
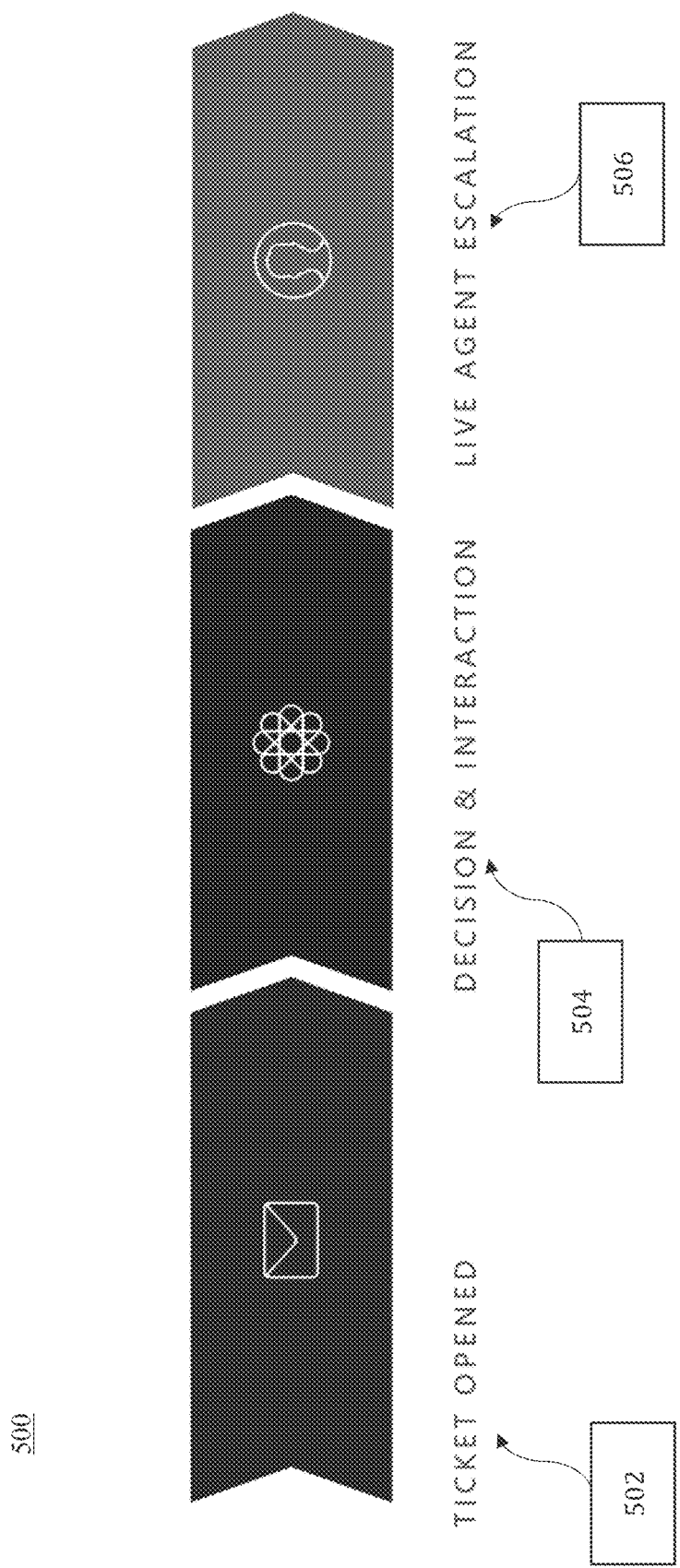
FIG. 5 is a diagram that illustrates a predictive workflow that is usable for implementing a method for providing automated support services by utilizing artificial intelligence to identify and resolve issues in natural language service requests, according to an exemplary embodiment.

FIG. 5 is a diagram 500 that illustrates a predictive workflow that is usable for implementing a method for providing automated support services by utilizing artificial intelligence to identify and resolve issues in natural language service requests, according to an exemplary embodiment. The diagram 500 may include a ticket opening step 502, a decision and interaction step 504, and a live agent escalation step 506.

As illustrated in FIG. 5, the predictive workflow begins at step 502. At step 502, a service request from a user is received and a ticket corresponding to the request may be opened. In an exemplary embodiment, the model may instantly perform network checks, exchange checks, and local machine checks when the ticket is opened. Then, the predictive workflow moves to step 504 where the model may interact with the user and make decisions corresponding to the request. In another exemplary embodiment, the model may determine next actions such as, for example, interact with the user via a graphical user interface to automatically update the user on the status of the request. The model may also, depending on a calculated factor weight of the support ticket and sentiment analysis, escalate the request to operation managers and post the request to a dashboard.

Next, the predictive workflow may move to the live agent escalation step 506. In another exemplary embodiment, the live agent may be engaged to resolve the issue and to update the support ticket. Once updated, the model may reinitiate a forensic check along the same issue path. The model may then close other service tickets that have been marked as having a similar issue. The model may also provide updates, which include information relating to the resolved issue, to users who have submitted similar support tickets.

Figure 6:
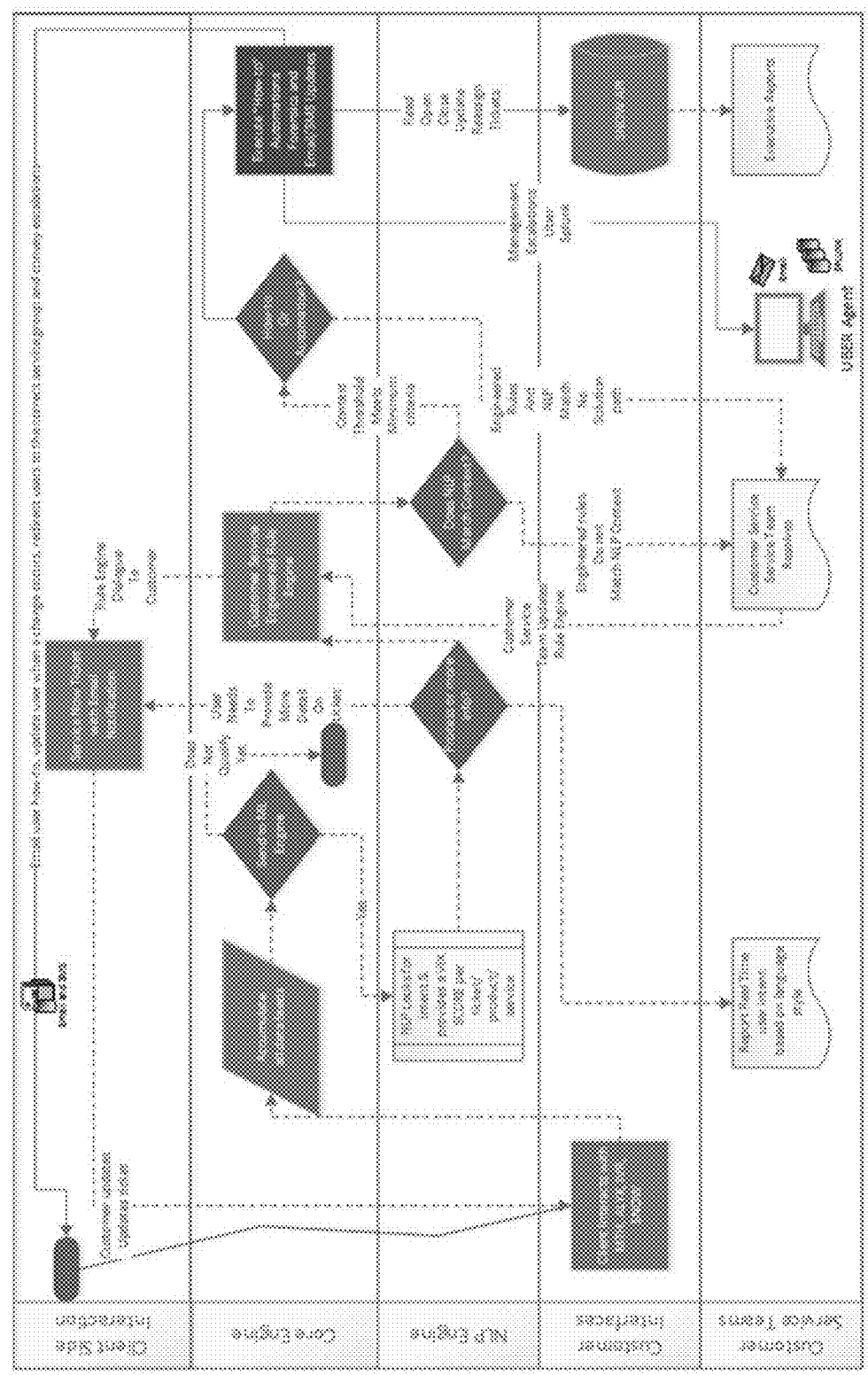
FIG. 6 is a telemetry diagram that illustrates a workflow that is usable for implementing a method for providing automated support services by utilizing artificial intelligence to identify and resolve issues in natural language service requests, according to an exemplary embodiment.

FIG. 6 is a telemetry diagram 600 that illustrates a workflow that is usable for implementing a method for providing automated support services by utilizing artificial intelligence to identify and resolve issues in natural language service requests, according to an exemplary embodiment.

As illustrated in FIG. 6, the system disclosed in the present application may include components such as customer service teams, customer interfaces, natural language processing engines, core engines, and client-side interaction mechanisms. The workflow begins with a user interacting with a graphical user interface of the customer interfaces component to submit a service request. Then, the core engine component accumulates all data feeds corresponding to the request. The core engine component may send the request and corresponding data to a machine learning engine. The machine learning engine may decide that the request does not yet qualify based on the corresponding data. However, when the request qualifies, the machine learning engine moves the request to the natural language processing engine.

The natural language processing engine may look for intent and may provide a customer fear factor score for the service request, for the product experiencing the issue, or for the service experiencing the issue. The natural language processing engine may use contexts in the service request to decide whether to process the service request or to request additional information from the user. A report including user intent based on language style may be generated in real-time and sent to the customer service teams. When additional information is required, the natural language processing engine may request additional details from the user via the client-side interaction mechanisms which includes, for example, an email notification.

When a decision to process the service request is made, the workflow moves to a customer service, engineered rule engine. The rule engine may determine whether the natural language processing context matches a known context. The rule engine may also dialogue directly with the user when necessary. When engineered rules do not match the natural language processing context, the service request is transmitted to a customer service team to be resolved. When the context threshold meets a predetermined minimum criterion, a core engine decides whether automated resolution of the service request is possible.

Based on a result of the automation determination, the service request may be transmitted to the customer service team to be resolved when engineered rules and natural language processing contexts do not match a known solution path. However, when the engineered rules and the natural language processing contexts match a known solution path, a "how-to" automation may be executed. Other executable automation tasks may include sending self-help resources to the user, updating the user when a change occurs, redirecting the user to the correct service group, and conveying escalations. The core engine component may also generate executive reports for customer service teams. The executive reports may include information relating to resolution of the service request.

Accordingly, with this technology, an optimized process for providing automated support services by utilizing artificial intelligence to identify and resolve issues in natural language service requests is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing automated support services by utilizing artificial intelligence, the method being implemented by at least one processor, the method comprising:

receiving, by the at least one processor via a graphical user interface, at least one request from a user, each of the at least one request including a request identifier;

compiling, by the at least one processor, operating state data when the at least one request is received, the operating state data representing a current state of a computing environment that is associated with the user;

performing, by the at least one processor using at least one model, a system check based on the compiled operating state data, the system check including a network check and a local machine check;

parsing, by the at least one processor using syntax analysis, the at least one request;

identifying, by the at least one processor from the parsed at least one request, at least one factor by using the at least one model,
   wherein the at least one factor includes a request context that relates to a necessity of a component and a request sentiment that relates to a tone of the user;
   wherein the at least one factor includes a score that is determined based on the request context and the request sentiment; and
   wherein the score includes a user fear factor score;

associating, by the at least one processor, the at least one request with a category corresponding to the at least one factor, the category relating to a characteristic of the at least one request and includes an urgent issue category;

determining, by the at least one processor using the at least one model, whether the at least one request can be automatically resolved based on the at least one factor and the category;

initiating, by the at least one processor, at least one action based on a result of the determining;

tracking, by the at least one processor, quantitative feedback and qualitative feedback for each of the at least one request by using the corresponding request identifier;

training, by the at least one processor, the at least one model by using additional data, the additional data including the tracked quantitative feedback and the tracked qualitative feedback; and assessing, by the at least one processor, the trained at least one model to determine whether at least one error rate is within a predetermined range.

2. The method of claim 1, wherein the at least one request relates to a support service inquiry corresponding to at least one from among an issue and a task.

3. The method of claim 1, further comprising:
compiling, by the at least one processor, status data when the at least one request is received from the user, the status data including at least one from among network data, storage data, server data, application data, and local machine data; and
associating, by the at least one processor, the status data with the at least one request.

4. The method of claim 1, further comprising:
identifying, by the at least one processor using the at least one model, at least one self-help resource based on a predetermined rule and the at least one factor, the at least one self-help resource including at least one from among an instructional video, an instructional electronic document, and a hyperlink;
transmitting, by the at least one processor via a communication interface, the at least one self-help resource to the user in response to the at least one request; and updating, by the at least one processor, the at least one request with information relating to the identified at least one self-help resource.

5. The method of claim 1, further comprising:
determining, by the at least one processor using the at least one model, whether a live agent is required to resolve the at least one request based on the at least one factor;
transmitting, by the at least one processor via a communication interface, the at least one request to the live agent based on a result of the determining; and
receiving, by the at least one processor via the communication interface, an indication from the live agent that the at least one request has been resolved, the indication including a live agent action.

6. The method of claim 5, further comprising:
identifying, by the at least one processor using the at least one model, at least one new request, the at least one new request including a new factor that is equivalent to the at least one factor; and
initiating, by the at least one processor, the live agent action to resolve the at least one new request.

7. The method of claim 1, further comprising:
determining, by the at least one processor using the at least one model, whether additional information is required from the user to automatically resolve the at least one request; and
transmitting, by the at least one processor based on a result of the determining, a notification to the user via a communication interface, the notification including an email notification requesting the additional information.

8. The method of claim 1, further comprising:
generating, by the at least one processor, a support ticket, the support ticket relating to an interaction between the user and a support provider;
generating, by the at least one processor, an identifier; and
associating, by the at least one processor, the identifier and the at least one request with the support ticket.

9. The method of claim 1, wherein the at least one model includes at least one from among a machine learning model, a mathematical model, a process model, and a data model.

10. The method of claim 1, wherein the syntax analysis includes at least one natural language processing technique that relates to automatic manipulation of natural language by computer software.

11. A computing device configured to implement an execution of a method for providing automated support services by utilizing artificial intelligence, the computing device comprising:
a processor;
a memory; and
a communication interface coupled to each of the processor and the memory,
wherein the processor is configured to:
receive, via a graphical user interface, at least one request from a user, each of the at least one request including a request identifier;
compile operating state data when the at least one request is received, the operating state data representing a current state of a computing environment that is associated with the user;
perform, by using at least one model, a system check based on the compiled operating state data, the system check including a network check and a local machine check;
parse, by using syntax analysis, the at least one request;
identify, from the parsed at least one request, at least one factor by using the at least one model,
wherein the at least one factor includes a request context that relates to a necessity of a component and a request sentiment that relates to a tone of the user;
wherein the at least one factor includes a score that is determined based on the request context and the request sentiment; and
wherein the score includes a user fear factor score;
associate the at least one request with a category corresponding to the at least one factor, the category relating to a characteristic of the at least one request and includes an urgent issue category;
determine, by using the at least one model, whether the at least one request can be automatically resolved based on the at least one factor and the category;
initiate at least one action based on a result of the determination;
track quantitative feedback and qualitative feedback for each of the at least one request by using the corresponding request identifier;
train the at least one model by using additional data, the additional data including the tracked quantitative feedback and the tracked qualitative feedback; and
assess the trained at least one model to determine whether at least one error rate is within a predetermined range.

12. The computing device of claim 11, wherein the at least one request relates to a support service inquiry corresponding to at least one from among an issue and a task.

13. The computing device of claim 11, wherein the processor is further configured to:
compile status data when the at least one request is received from the user, the status data including at least one from among network data, storage data, server data, application data, and local machine data; and
associate the status data with the at least one request.

14. The computing device of claim 11, wherein the processor is further configured to:
identify, by using the at least one model, at least one self-help resource based on a predetermined rule and the at least one factor, the at least one self-help resource including at least one from among an instructional video, an instructional electronic document, and a hyperlink;
transmit, via the communication interface, the at least one self-help resource to the user in response to the at least one request; and
update the at least one request with information relating to the identified at least one self-help resource.

15. The computing device of claim 11, wherein the processor is further configured to:
determine, by using the at least one model, whether a live agent is required to resolve the at least one request based on the at least one factor;
transmit, via the communication interface, the at least one request to the live agent based on a result of the determination; and
receive, via the communication interface, an indication from the live agent that the at least one request has been resolved, the indication including a live agent action.

16. The computing device of claim 15, wherein the processor is further configured to:
identify, by using the at least one model, at least one new request, the at least one new request including a new factor that is equivalent to the at least one factor; and initiate the live agent action to resolve the at least one new request.

17. The computing device of claim 11, wherein the processor is further configured to:
determine, by using the at least one model, whether additional information is required from the user to automatically resolve the at least one request; and
transmit, based on a result of the determination, a notification to the user, the notification including an email notification requesting the additional information.

18. The computing device of claim 11, wherein the processor is further configured to:
generate a support ticket, the support ticket relating to an interaction between the user and a support provider;
generate an identifier; and
associate the identifier and the at least one request with the support ticket.

19. The computing device of claim 11, wherein the at least one model includes at least one from among a machine learning model, a mathematical model, a process model, and a data model.

20. The computing device of claim 11, wherein the syntax analysis includes at least one natural language processing technique that relates to automatic manipulation of natural language by computer software.

* * * * *